United States Patent
Bowman (10) Patent No.: US 6,264,754 B1
(45) Date of Patent: Jul. 24, 2001

(54) VEHICLE WASHING APPARATUS AND METHOD

(76) Inventor: Bradford K. Bowman, 5406 Crossbridge Dr., West Chester, OH (US) 45069

( * ) Notice: Subject to any disclaimer, the term of this patent is extended or adjusted under 35 U.S.C. 154(b) by 0 days.

(21) Appl. No.: 09/322,968

(22) Filed: May 28, 1999

(51) Int. Cl.$^7$ ..................................................... B60S 3/06
(52) U.S. Cl. ............................. 134/6; 15/53.3; 15/DIG. 2
(58) Field of Search .................................. 15/53.2, 53.3, 15/97.3, DIG. 2; 134/6

(56) References Cited

U.S. PATENT DOCUMENTS

| | | | |
|---|---|---|---|
| Re. 33,849 | * 3/1992 | Detrick | 15/DIG. 2 |
| 2,215,692 | 9/1940 | Fleming . | |
| 3,233,264 | 2/1966 | Nickl et al. . | |
| 3,278,962 | 10/1966 | Christ . | |
| 3,304,565 | 2/1967 | Fuhring . | |
| 3,425,080 | 2/1969 | Dolitzsch et al. . | |
| 3,471,883 | 10/1969 | Ennis . | |
| 3,526,012 | 9/1970 | Cirino . | |
| 3,559,225 | 2/1971 | Gougoulas . | |
| 3,601,833 | 8/1971 | Takeuchi . | |
| 3,624,851 | 12/1971 | Barber . | |
| 3,626,536 | 12/1971 | Napoli . | |
| 3,626,537 | 12/1971 | Wilson . | |
| 3,633,231 | 1/1972 | Capra . | |
| 3,662,419 | 5/1972 | Dini . | |
| 3,708,816 | 1/1973 | Napoli . | |
| 3,720,972 | 3/1973 | Ennis . | |
| 3,731,331 | 5/1973 | Haley et al. . | |
| 3,747,151 | * 7/1973 | Takeuchi | 15/DIG. 2 |
| 3,809,919 | * 5/1974 | Aaron | 15/DIG. 2 |
| 3,852,842 | 12/1974 | Weigele et al. . | |
| 3,854,054 | * 12/1974 | Conn | 15/DIG. 2 |
| 3,877,107 | 4/1975 | Cirino . | |
| 3,908,219 | 9/1975 | Chapman et al. . | |
| 3,926,663 | 12/1975 | Gray . | |
| 4,021,877 | 5/1977 | Miner . | |
| 4,024,598 | 5/1977 | Miner . | |
| 4,194,923 | 3/1980 | Johnson . | |
| 4,225,995 | 10/1980 | Ennis . | |
| 4,293,914 | * 10/1981 | Van Trang | 15/DIG. 2 |
| 4,299,003 | 11/1981 | Ennis . | |
| 4,769,868 | * 9/1988 | Pagnanelli et al. | 15/DIG. 2 |
| 4,935,982 | 6/1990 | Ennis . | |
| 5,077,859 | 1/1992 | Ennis . | |
| 5,279,013 | 1/1994 | Krichbaum . | |
| 5,715,558 | 2/1998 | Johnson . | |
| 5,930,859 | * 8/1999 | Ennis | 15/DIG. 2 |

* cited by examiner

Primary Examiner—Terrence R. Till
(74) Attorney, Agent, or Firm—Wood, Herron & Evans, L.L.P.

(57) ABSTRACT

A vehicle washing machine having a frame supporting member adapted to be located above the vehicle, and a conveyor moving the vehicle past the washing machine. A shuttle plate is mounted on the supporting member, and a shuttle plate motor is connected to the shuttle plate. A proximal end of an arm is pivotally mounted on the shuttle plate, and a cleaning element is mounted at the distal end of the arm. A sensor is used to detect the presence of the vehicle, and a controller connected to the sensor, the shuttle plate motor and the conveyor commands the shuttle plate motor to move the proximal end of the arm between outer and inner positions on the supporting member in response to different locations of the cleaning element with respect to the vehicle, thereby permitting the cleaning element to wash a greater portion of the vehicle.

39 Claims, 7 Drawing Sheets

VEHICLE WASHING APPARATUS AND METHOD

FIELD OF THE INVENTION

This invention relates generally to the field of cleaning machines and more particularly, to an improved apparatus for washing vertical surfaces on vehicles.

BACKGROUND OF THE INVENTION

Vehicle washing services have been known for decades. Often such washing services utilize washing machines that are designed to wash particular portions of the vehicles. For example, one known type of washing machines has a relatively large and long brush rotating about a generally vertical axis that is used to wash vertical surfaces of the vehicle as the vehicle moves past the washing machine. The vehicle is either driven or conveyed past the washing machine. With some washing machines, one or more rotating vertical brushes are stationary and simply wash one or more side surfaces as the vehicle moves past the brushes. With other machines, a rotating brush is located at one side of the vehicle and is moved along a path parallel to the path of vehicle travel.

With still other machines, a brush is mounted at the distal end of a pivot arm having its proximal end pivotally connected to a frame above the vehicle, and the brush is used to wash one side and one or both ends of the vehicle. A critical design decision with such machines is the determination of where to mount the proximal end of the arm with respect to the centerline of the vehicle. In order to best wash the front end of a vehicle, the proximal end of the pivot arm should be mounted in an outside position close to the side being washed. Thus, in washing the front of the vehicle starting at the center, as the vehicle moves forward, the pivot arm extends outward, thereby allowing the brush to move forward as it moves across the front of the vehicle. However, after the brush has washed the side of the vehicle, as the brush moves around the rear of the vehicle, the outside location of the pivot point results in the pivot arm moving the brush away from the vehicle simultaneously with the vehicle moving away from the brush. The net result is that as the brush moves across the rear of the vehicle, the force of its contact with the vehicle is constantly diminishing, thereby producing an equally diminishing washing action and a poorer quality wash.

The ability of the brush to wash the rear side may be improved by moving the pivot point of the arm inward. Therefore, as the brush begins washing from one side of the rear, as the vehicle moves forward, the pivot arm rotates toward the vehicle, thereby maintaining the brush in contact with the rear of the vehicle. While the quality of the washing action on the rear end of the vehicle is improved with the more inward location of the pivot point, the quality of the washing action on the front end of the vehicle is reduced. When washing the front end of the vehicle, when pivot point of the arm is inward, as the pivot arm moves from the center of the front end toward one side, the vehicle is moving forward, but the arc of the pivot arm is moving the brush toward the vehicle. With the brush moving toward the vehicle, the forces between the brush and the front end of the vehicle build up very rapidly, thereby increasing the speed of the brush as it moves across the front end. The speed of the brush may be great enough that the brush loses contact with the vehicle as it moves around the front corner of the vehicle. In other situations, since the brush is rotating on a flexible spindle, the forces may be great enough to propel the rotating brush off of the front end and up over a portion of the hood of the vehicle.

Thus, the location of the pivot point of the arm with respect to the vehicle centerline results in a compromise with respect to the ability of the washing machine to wash either or both the front and rear ends of the vehicle. The user of such a machine has several options. One option is to simply accept the lesser quality washing action on the ends of the vehicle. Another option is to supplement the washing action of the machine with manual washing of the front and/or rear ends either with every vehicle or, as required, based on an inspection of the vehicle. A further option is to choose a pivot point location that provides the desired quality wash at either the front or the rear end of the vehicle and wash the other end of the vehicle with another piece of equipment or manually. Thus, there is a need for an improved vehicle washing machine.

SUMMARY OF THE INVENTION

The present invention provides a vehicle washing machine that provides a consistent high quality washing action over the sides and ends of the vehicle. Further, the vehicle washing machine of the present invention has a reduced washing cycle time, thus providing an increase in productivity. The vehicle washing machine of the present invention utilizes minimal floor space, requires no manual labor and thus, is more economical than known vehicle washing machines.

In accordance with the principles of the present invention and in accordance with the described embodiments, the present invention provides a vehicle washing machine having a first, vehicle path of motion and a frame supporting member adapted to be located above the vehicle. A shuttle plate is mounted on the supporting member for movement along a second path of motion, and a proximal end of an arm is pivotally mounted on the shuttle plate. A cleaning element is mounted at the distal end of the arm. The shuttle plate moves the proximal end of the arm between outer and inner positions on the supporting member in response to different locations of the cleaning element with respect to the vehicle, thereby permitting the cleaning element to wash a greater portion of the vehicle.

In one aspect of the invention, a shuttle plate motor moves the shuttle plate between the inner and outer positions, and a conveyor moves the vehicle past the washing machine. A sensor is used to detect the presence of the vehicle, and a controller connected to the sensor, the shuttle plate motor and the conveyor controls the operation of the shuttle plate motors in response to determining particular positions of the cleaning element with respect to the vehicle.

In another aspect of the invention, in the outer position, the shuttle plate supports the cleaning element so that the cleaning element wipes one side of the vehicle as the conveyor moves the vehicle past the cleaning element. When the controller determines a first position of the cleaning element with respect to the vehicle, the controller operates the shuttle plate motor to move the shuttle plate and the arm to an inner position closer to a centerline of the washing machine. With the arm in the inner position, the cleaning element is able to wipe a greater area of the end of the vehicle than would be possible with the arm in the outer position. When the controller determines a second position of the cleaning element with respect to the vehicle, the controller operates the shuttle plate motor to move the shuttle plate back to the starting outer position.

A second embodiment of the invention provides a method of washing a vehicle comprising disposing a cleaning element with respect to one side of the vehicle. The cleaning element is mounted to a distal end of an arm, and the proximal end of the arm is pivotally attached to a shuttle plate located at an outer position with respect to a supporting member. The vehicle is moved in a first direction causing the cleaning element to wipe across a substantial portion of surfaces on a front end and a side of the vehicle. When a controller determines that the cleaning element is at a first position with respect to the vehicle, the shuttle plate is moved from the outer position to an inner position. Continued motion of the vehicle in the first direction causes the cleaning element to wipe across a substantial portion of surfaces on the rear end of the vehicle. When the controller detects that the cleaning element is at a second location with respect to the vehicle, the shuttle plate is moved from the inner position back to the outer position.

These and other objects and advantages of the present invention will become more readily apparent during the following detailed description together with the drawings herein.

DETAILED DESCRIPTION OF THE INVENTION

Figure 1:
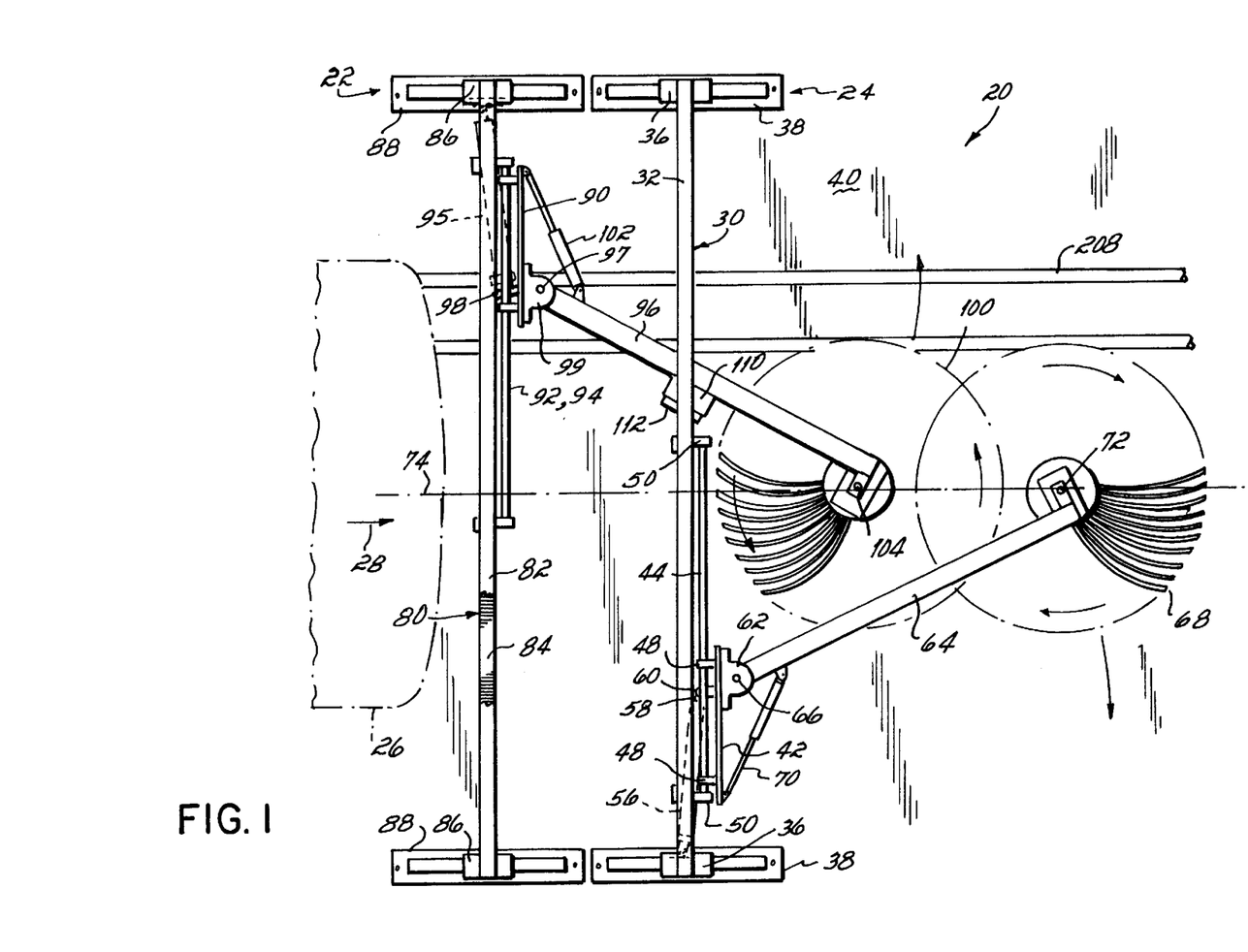
FIG. 1 is a top plan view of the vehicle washing machine in accordance with the principles of the present invention.
Figure 1A:
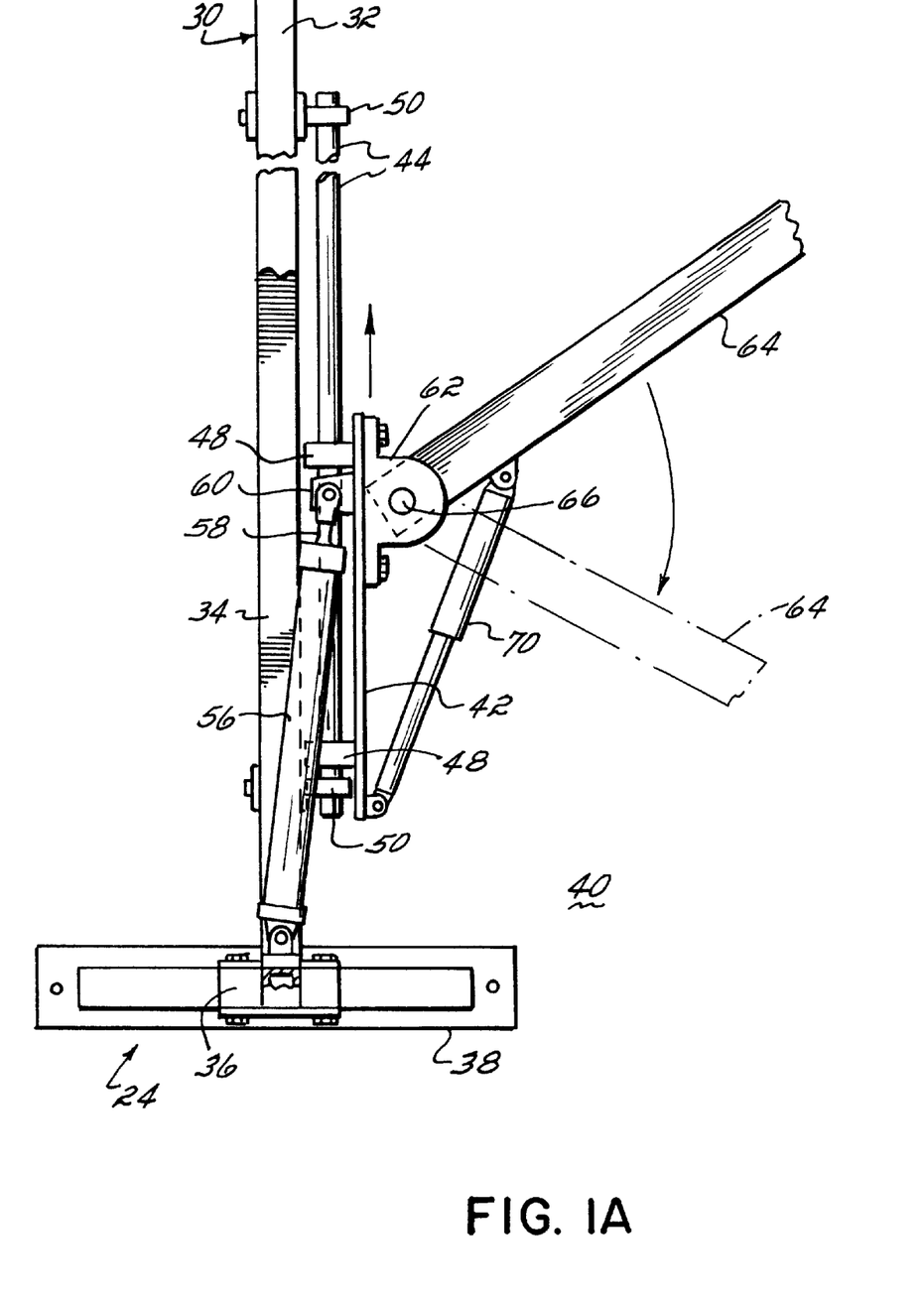
FIG. 1A is a larger fragmentary view of a shuttle plate and frame of the vehicle washing machine of FIG. 1.
Figure 2:
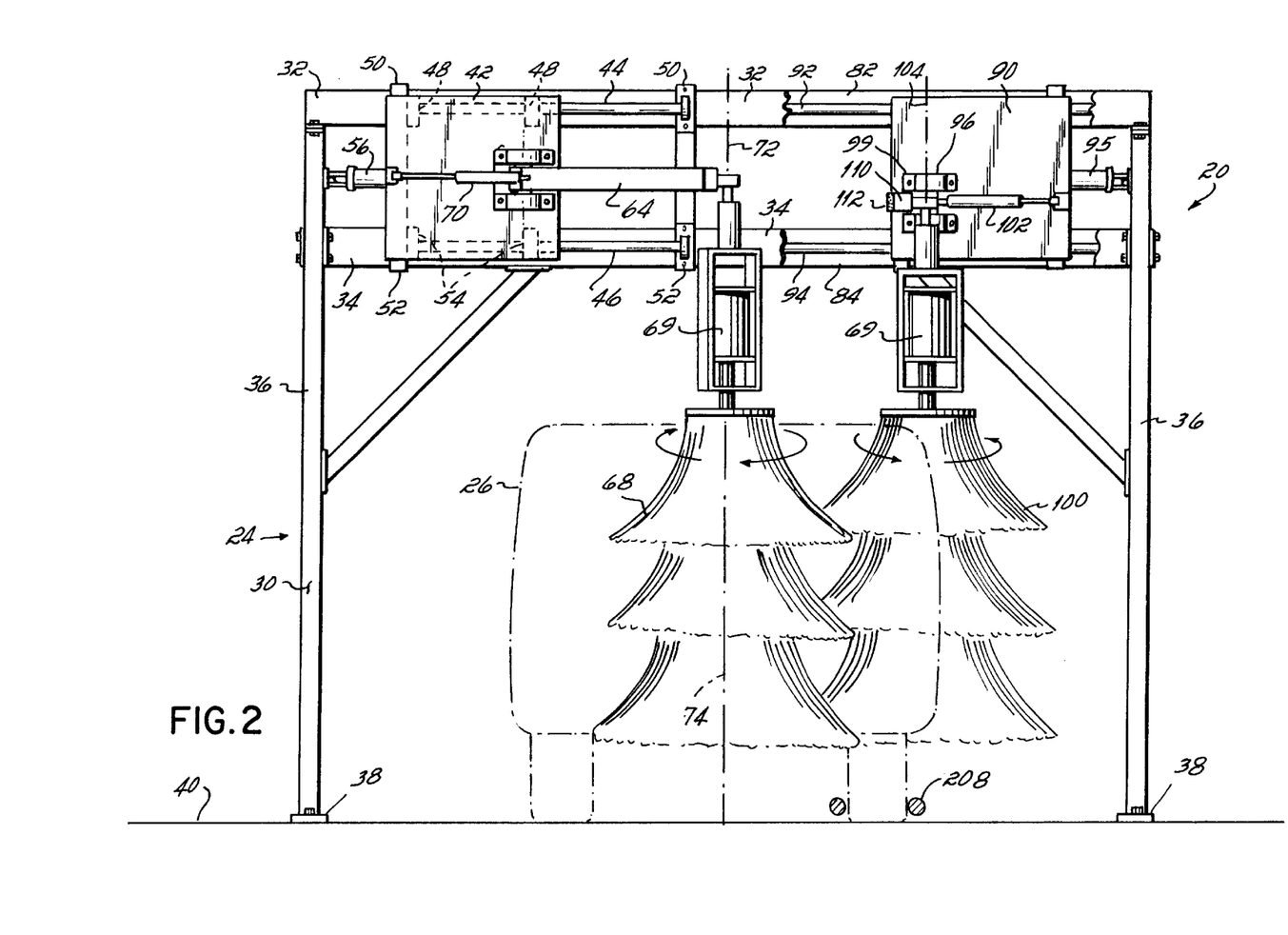
FIG. 2 is a front elevation view of the vehicle washing machine of FIG. 1.

Referring to FIGS. 1, 1A and 2, a vehicle washing machine 20 is comprised of a left side washing machine 22 and a right side washing machine 24. The washing machines 22, 24 are used to wash the generally vertical surfaces on the front, the sides and the rear of a vehicle 26 moving through the vehicle washing machine 20 in the direction indicated by the arrow 28. The right side washing machine 24 includes a right frame 30 comprised of upper and lower crossrails 32, 34, respectively, located above the vehicle 26 and extending in a direction generally perpendicular to the direction of travel 28. The crossrails 32, 34 are attached at their ends to a pair of columns 36 that support the crossrails 32, 34 at their desired height above the vehicle 26. The columns 34 are secured at their lower ends to a floor 40 by a pair of feet or plates 38. Thus, the frame 30 has an inverted generally U-shape with a height extending above the height of the vehicle 26 and a length greater than the width of the vehicle, thereby permitting the vehicle 26 to move under the frame 30.

A right shuttle plate 42 is slidably mounted to upper and lower linear bearings 44, 46, respectively, that, in turn, are mounted to the respective upper and lower crossrails 32, 34. A pair of upper bearing blocks 48 are mounted on the rear of the shuttle plate 42 and aligned to receive the upper linear bearing 44. The ends of the linear bearing 44 are secured a desired distance from the upper rail 32 by support brackets 50. Similarly, the lower linear bearing 46 is supported at its ends to the lower rail 34 by brackets 52. A pair of bearing blocks 54 are mounted to the rear of the shuttle plate 42 and are aligned to receive the linear bearing 46. A right shuttle plate motor 56, for example, a hydraulic or pneumatic cylinder, is pivotally connected at one end to the vertical column 36. A cylinder rod 58 extending from the opposite end of the cylinder 56 is pivotally connected at its distal end to a pivot block 60 mounted on the rear side of the shuttle plate 42 (FIG. 1A).

A pivot block 62 is mounted on the front side of the shuttle plate 42 preferably opposite the location of the pivot block 60. A right arm 64 has a proximal end pivotally connected to the pivot block 62 and pivots with respect to a generally vertical pivot axis 66. The arm 64 extends generally horizontally in a direction generally the same as the direction of motion 28 of the vehicle 26. A right cleaning or washing element or brush 68 is mounted on the distal end of the arm 64. The brush 68 is powered by a fluid motor in a known manner to rotate generally clockwise as viewed from the top in FIG. 1. The brush 68 is approximately four feet in diameter when rotating and approximately six feet long. Thus, the vertically hanging brush has a size capable of contacting and washing the vertical surfaces of most automobiles, pickup trucks, vans and other vehicles. One or more biasing elements 70 have one end pivotally connected to an outer edge of the shuttle plate 42 and an opposite end pivotally connected to the arm 64. The biasing elements 70 bias or push the arm 64 inwardly to a quiescent position at which the axis of rotation 72 of the brush 68 is approximately aligned with the centerline 74 of the frame 30, the vechical 26 and the vehicle washing machine 20. The biasing elements 70 may be implemented using gas cylinders, shock absorbers, or other known devices that provide the desired biasing force.

The left side washing station 22 is substantially identical to the right side washing station 24 just described. The washing station 22 has a similar generally U-shaped left frame 80 with upper and lower crossrails 82, 84, respectively, that are supported at their desired elevation by columns 86 that have feet 88 at their lower end for securing the frame 80 to the floor 40. A left shuttle plate 90 is mounted on upper and lower linear bearings 92, 94, respectively, for generally horizontal linear motion toward and away from the centerline 74. The linear bearings 92, 94 are mounted at their ends to the respective crossrails 82, 84 in a manner similar to that described with respect to the right side wash station 24. A left cylinder 95 is pivotally mounted at one end to the column 86 and has a cylinder rod 98 extending from its opposite end. The distal end of the cylinder rod 98 is pivotally mounted to the rear side of the left shuttle plate 90. A proximal end of the left arm 96 is pivotally mounted to a pivot block 99 to rotate with respect to generally vertical axis 97. The pivot block 99 is secured to the front of the shuttle plate 90. As shown in FIG. 2, the pivot block 62 is mounted higher than the pivot block 99, so that the arm 64 is higher than the arm 96. Thus, the arm 64 can pass over the arm 96 without interference. A left cleaning or washing element or brush 100 is mounted to the proximal end of the arm 96. The brush 100 is identical to the brush 68, however, it is powered to rotate in the counterclockwise direction as viewed from the top in FIG. 1. One or more biasing elements 102 are pivotally connected at one end to an outer edge of the shuttle plate 90 and pivotally connected their opposite end to the arm 96. The biasing elements 102 are identical to the biasing elements 70 and are effective to bias the arm 96 inwardly such that the axis of rotation 104 of the brush 100 is approximately aligned with the centerline 74 of the wash station 20.

Figure 3:
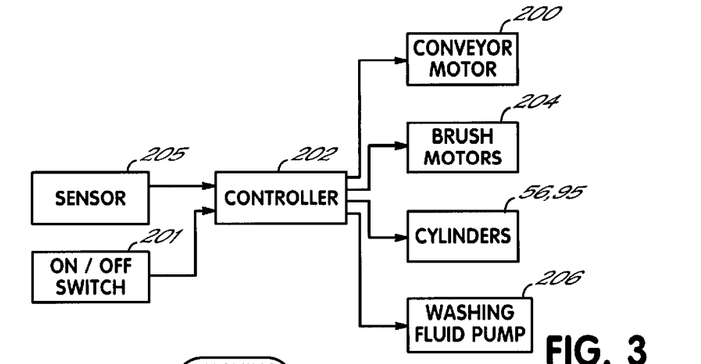
FIG. 3 is a schematic block diagram of a control system for the vehicle washing machine in accordance with the principles of the present invention.

Referring to FIG. 3, upon ON/OFF switch 201 being switched to the ON position, a controller 202 operates the conveyor motor 200, brush motors 204 and washing fluid pump motor 206. The controller 202 can be implemented with a personal computer utilizing commercially available I/O boards or any programmable logic controller with arithmetic capabilities. Normally, the motors 200, 204 are hydraulic motors, but they can also be electric or pneumatic. Motion of the vehicle 26 through the vehicle washing machine 20 is normally effected by a conveyor 208 connected to conveyor motor 200. The conveyor 208 is normally a chain driven from a sprocket on the conveyor motor 200 and having its ends connected to form a continuous loop. The conveyor 208 normally includes spaced rollers that contact tires of the vehicle to pull the vehicle past the washing machine 20. In a known manner, a proximity sensor 205 provides a signal to the controller 202 identifying the location of the front and rear ends of the vehicle 26 as it is moved by the conveyor 208. The proximity sensor 205 can be magnetic, optical or any other known proximity type of sensor. The velocity of the conveyor motor 200 and thus, conveyor 208 is commanded by the controller 202, and the relative location of the vehicle washing station 20 with respect to the sensor 205 is also known. Therefore, the controller 202 is able to continuously track the position of the front and rear ends of the vehicle 26 with respect to the vehicle washing machine 20. In other words, knowing the conveyor velocity, the controller 202 is able to determine the relative position of the front and/or rear of the vehicle at any time after it detects the vehicle with the sensor 205.

Figure 4:
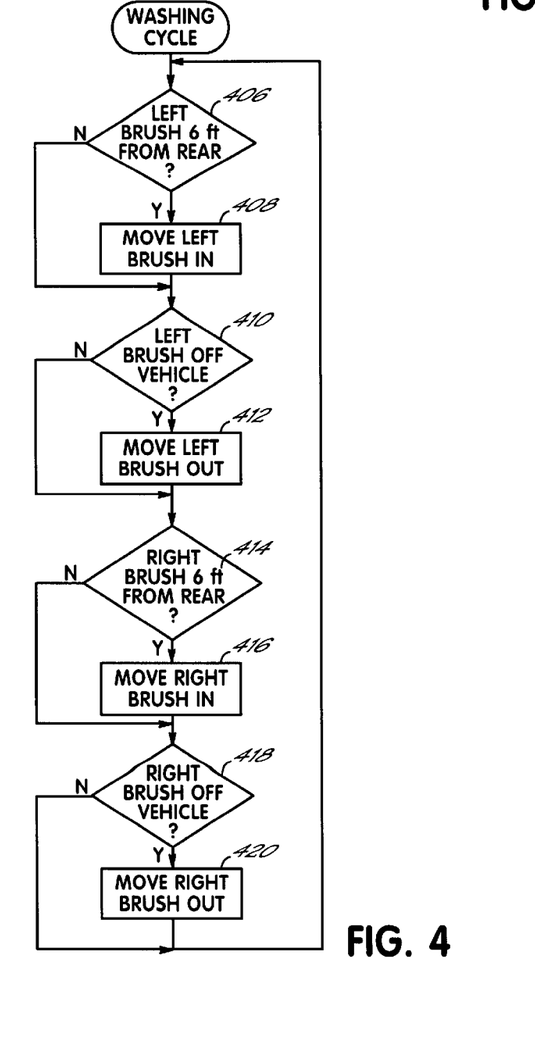
FIG. 4 is a flow chart illustrating a general cycle of operation of the vehicle washing machine in accordance with the principles of the present invention.
Figure 5A:
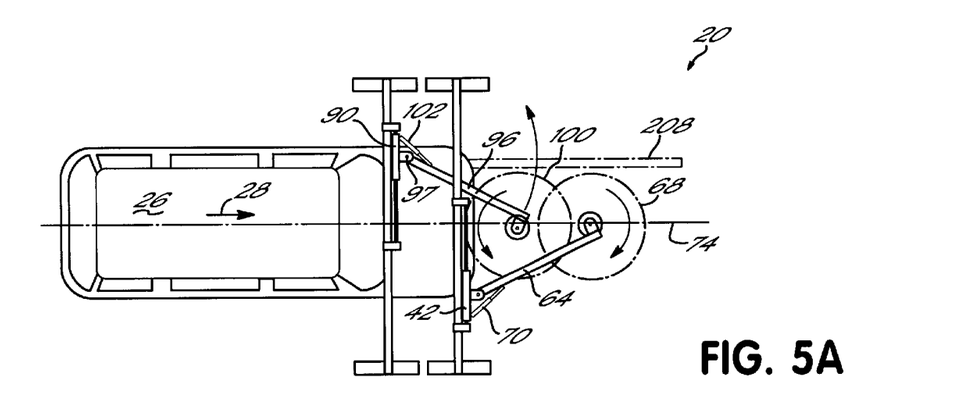
FIGS. 5A–5J are schematic diagrams illustrating a sequence of operation of the various components of the vehicle washing machine in accordance with the principles of the present invention. The shuttle plate cylinders have been omitted for purposes of illustration.

FIG. 4 illustrates the process implemented by the controller 202 in controlling the operation of the vehicle washing machine 20 which is illustrated in detail in FIGS. 5A–5J. After the conveyor and brush motors 200, 204 have been started, the conveyor 208 moves the vehicle 26 to the position as illustrated in FIG. 5A. Referring to FIG. 5A, the shuttle plates 42, 90 are at their outermost positions with respect to the centerline 74; and the centerlines 72, 104 of the respective rotating brushes 68, 100 are located substantially on the centerline 74. The front end of the vehicle 26 initially contacts the left brush 100 at approximately the center point of the front end of the vehicle. The counterclockwise rotation of the brush 100 causes it to walk across and wash the front surfaces of the vehicle 26 that are mostly to the left of the centerline 74. The counterclockwise rotation of the brush 100 rotates the pivot arm 96 counterclockwise, thus moving the rotating brush 100 in the same direction as the vehicle motion 28. The forward motion of the vehicle 26 and brush 100 permits the force between the brush 100 and front end of the vehicle 26 to be principally controlled by the biasing element 102 (FIG. 1, 1A, 2). As the brush 100 moves away from the centerline 74, the biasing element 102 applies a force against the arm 96 to maintain the brush 100 in contact with the vehicle 26.

Figure 5B:
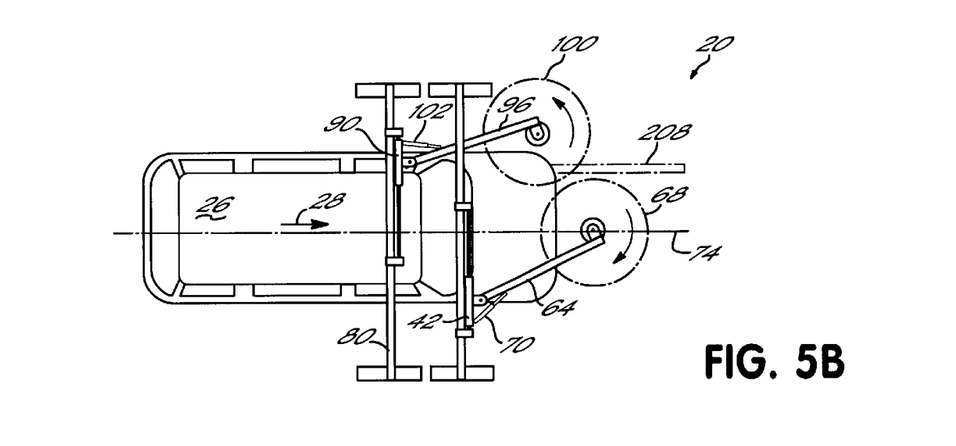
Figure 5C:
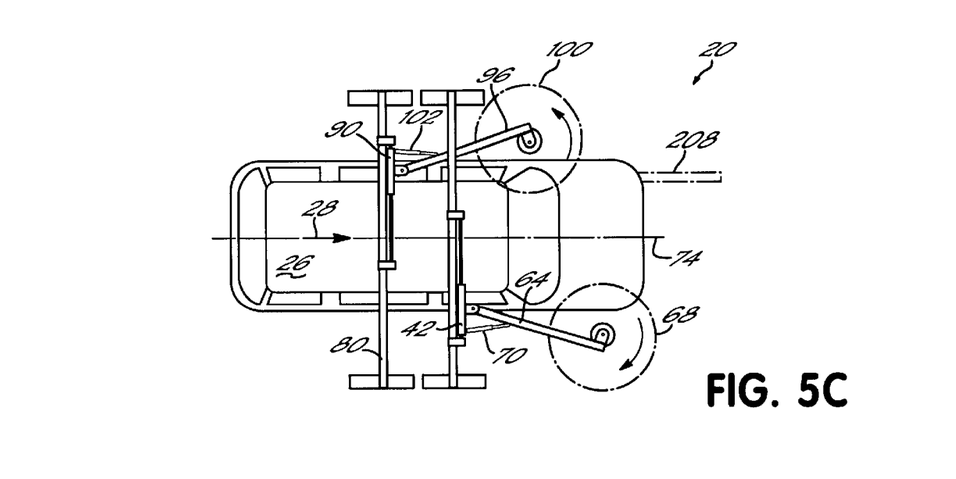

Referring to FIG. 5B, as the left brush 100 moves around and washes the left front corner of the vehicle 26 and the surfaces on the left side of the vehicle 26, the right brush 68 then contacts the front end of the vehicle 26 approximately at its center point. The clockwise rotation of the brush 68 causes it to walk across and wash the front surfaces that are to the right of the centerline 74 and move toward the right side of the vehicle in opposition to the force being provided by the biasing elements 70 (FIG. 1, 1A, 2). Further, the clockwise rotation of the brush 68, causes the arm 64 to pivot clockwise, thereby moving the rotating brush 68 in the same direction as the vehicle 26 is being conveyed. The clockwise rotation of the brush 68 further causes it to walk around the front right corner of the vehicle 26, and as shown in FIG. 5C, the brushes 100, 68 then proceed to move across and wash the surfaces on the respective left and right sides of the vehicle 26.

Figure 5D:
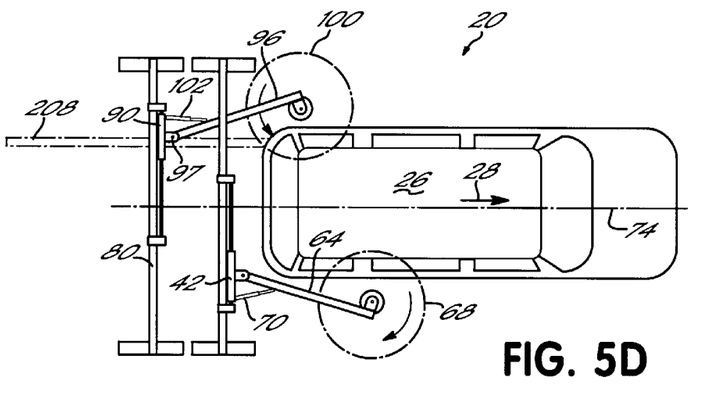
Figure 5E:
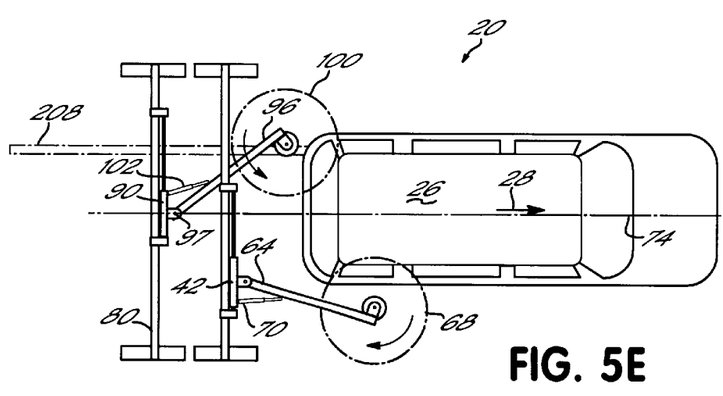

With continued motion of the vehicle 26 on the conveyor 208, the left brush 100 moves to a position illustrated in FIG. 5D. If the shuttle plate 90 is maintained in the outer position, as the brush 100 moves around the left rear corner of the vehicle 26, the counterclockwise rotation of the brush 100 moves the brush 100 toward the centerline 74, thereby imparting a clockwise rotation of the arm 96. When the arm 96 reaches position that is perpendicular to the frame 80, the brush 100 is at its closest position to the rear end of the vehicle 26. Further clockwise rotation of the arm will move the brush 100 in a direction opposite the direction of motion 28 of the vehicle 26. Thus, while portions of the brush 100 may be contacting the rear end of the vehicle 26, the forces between the brush 100 and the vehicle 26 will be diminishing and the washing action lessening. The net result is a poor quality washing action over the rear end of the vehicle.

in order to prevent such a situation from occurring, the position of the shuttle plate 90 and pivot point 97 is moved toward the centerline 74. The controller 202 at process step 406, determines whether the left side brush 100 has reached a point approximately six feet from the rear of the vehicle 26. The controller 202 sets the velocity of the conveyor 208 and knows the length of the vehicle 26 based on the inputs from the proximity switch 205. Therefore, the controller 202 can determine the amount of time required for the conveyor 208 to move the rear of the vehicle 26 from its point of detection by sensor 205 to within six feet of the centerline 104 of the brush 100. When that brush location is determined as illustrated in FIG. 5D, the controller 202 at 408, initiates the operation of the left shuttle plate motor or cylinder 95 to move the shuttle plate 90 from its outermost position through a displacement along a path of motion on the linear bearings 92, 94 perpendicular to the first path of motion 28 to its innermost position illustrated in FIG. 5E. In that position, the pivot point 97 of the arm 96 is located on the centerline 74.

Figure 5F:
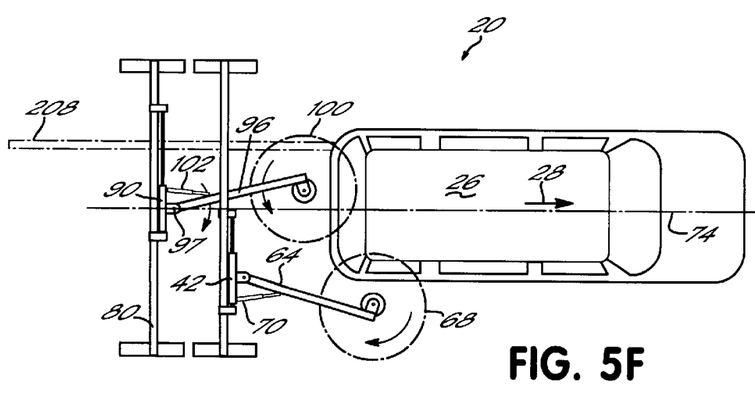
Figure 5G:
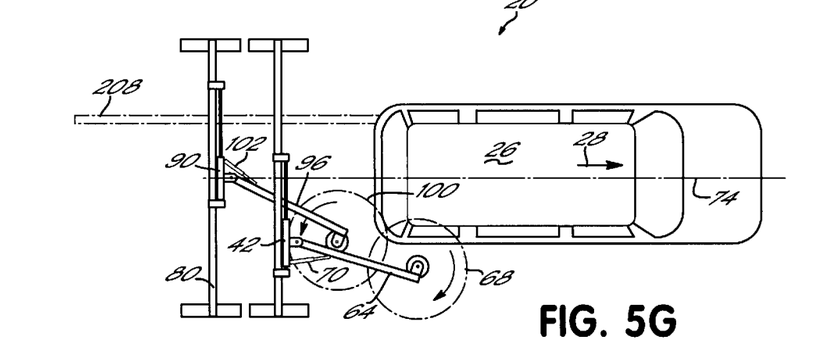

At the innermost position, the shuttle plate 90 is over the centerline 74, and the pivot point 97 of the arm 96 is approximately on the centerline 74, thereby placing the brush 100 in the best position on the rear end of the vehicle 26 to properly wash at least half of the rear end of the vehicle 26. As shown in FIG. 5F, with the proximal end of the arm 96 of the brush 100 on the centerline 74, the clockwise rotation of the arm 96 results in the brush moving in the same forward direction that the vehicle 26 is moving. Further, it isn't until after the brush 100 passes over the centerline 74 that the clockwise rotation of the arm 96 results in the brush 100 moving in a direction opposite the direction of the vehicle 26. Further, the biasing element 102 is applying a substantial biasing force to arm 96 and brush 100 in order to maintain brush 100 in proper washing contact with the rear of the vehicle 26. Thus, as shown in FIG. 5G, the center location of the proximal arm 96 permits the left side brush 100 to walk across and properly wash not only surfaces on the left half of the rear of the vehicle 26 as well as some surfaces on the rear of the vehicle 26 to the right of the centerline 74. Further, the greater frictional force between the brush 100 and the vehicle 26 that provides a better washing action also increases the relative velocity between the brush 100 and the vehicle 26, thereby reducing the time of the washing cycle.

Figure 5H:
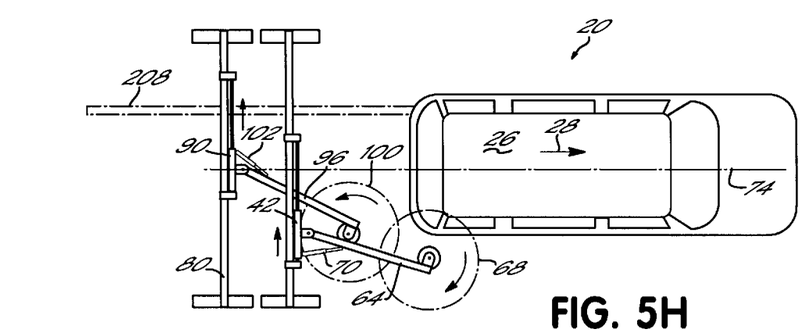
Figure 5I:
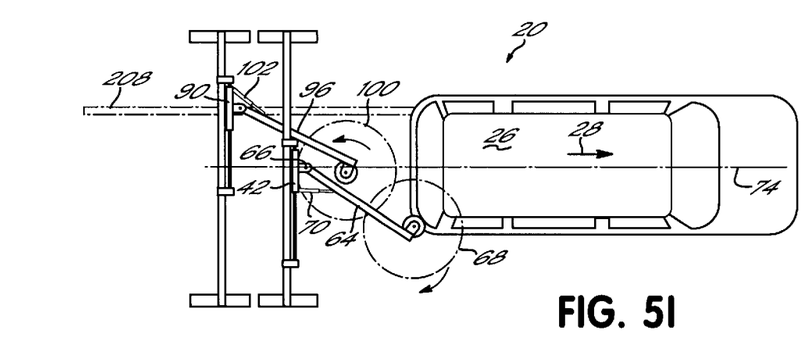

With continuing motion of the vehicle 26 on the conveyor 208, the controller 202 next at 410, determines when the left brush 100 loses contact with the vehicle 26 as illustrated in FIG. 5H. The controller 202 determines the amount of time required for the conveyor to move the vehicle 26 past the reach of, and out of contact with, the brush 100. When that happens, the inertia of the swinging left arm 96 may carry it below the right arm 64; and the controller 202 operates the left side cylinder 95 to move the left side shuttle plate 90 to the left to its outermost starting position as illustrated in FIG. 5I, thereby placing the centerline 104 of brush 100 substantially on the centerline 74.

Figure 5J:
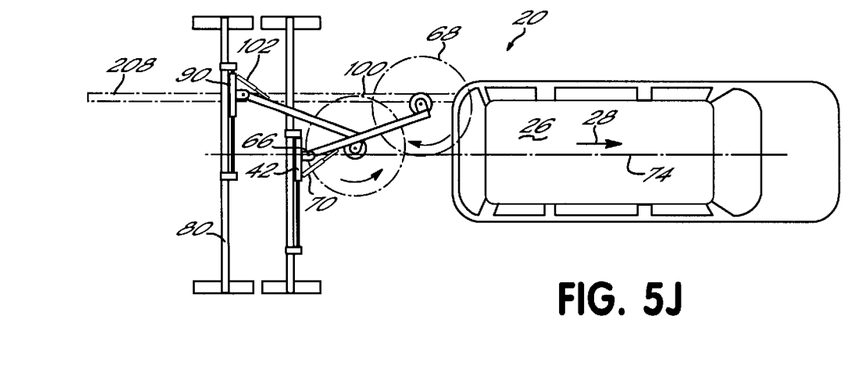

Knowing the time at which the left brush 100 is within six feet of the rear of the vehicle 26 and further, knowing that the right brush 68 is forward of the left brush 100 by approximately 3.25 feet, the controller 202 then at 414, determines how much more time is required for the right brush 68 to be approximately six feet from the rear of the vehicle 26. When that location is detected, the controller 202 at 416 operates the right cylinder 56 to extend the cylinder rod 58, thereby moving the shuttle plate 42 on the linear bearings 44, 46 to its innermost position close to the centerline 74 as illustrated in FIG. 5I. In a similar manner, as described with respect to the left brush 100, the pivot point 66 of the arm 64 is moved inward to the centerline 74 and thus, in a position to permit the brush 68 to more evenly contact the rear end of the vehicle 26. Further, the arm 64 has a sufficient biasing force to maintain the brush 68 in contact with the rear end of the vehicle 26, so that all of the right half of the rear end of the vehicle 26 is properly washed. As illustrated in FIG. 5J, with the shuttle plate 42 and pivot point 66 at its innermost position, the right brush 68 moves across and wash surfaces on the right half of the rear of the vehicle 26 as well as some surfaces on the rear of the vehicle 26 to the left of the centerline 74. As the right brush 68 finishes its leftward motion, the right arm 64 may pass over the left arm 96. At 418, the controller 202 then determines when the right brush 68 loses contact with the vehicle 26 and thereafter, at 420, initiates operation of the right cylinder 56 to move the right shuttle plate 42 back to its outer starting location as illustrated in FIG. 5A. Thus, the centerline 72 is again substantially aligned with the centerline 74. The washing cycle then returns to process step 406 to await the arrival of the next vehicle. As with the left brush, the inner position of the pivot axis 66 of the right arm 64 provides a better washing action and also increases the relative velocity between the brush 68 and the vehicle 26, thereby reducing the time of the washing cycle.

It should be noted that the speed of the conveyor 208 and vehicle 26 past the washing machine 20 is substantially constant; and therefore, the speed at which the right and left brushes 100, 68 move down the respective left and right sides of the vehicle 26 is also substantially constant. However, the rate at which the brushes move around the corners of the vehicle 26 and cross the ends will vary as a function of the resistive force that the surface of the vehicle 26 presents to the brushes 68, 100. For example, referring to FIG. 5E, as the left brush 100 approaches the left rear corner of the vehicle 26, the rate at which the brush 100 turns the corner and moves across the rear of the vehicle 26 is dependent on the frictional forces between the surface of the vehicle 26 and the rotating brush 100. Those frictional forces will vary depending on various factors, such as the type of vehicle. For example, a van has tall side and rear surfaces and presents substantially more friction than a sports car having one-quarter or less of the surface area. Thus, the brush 100 will grab the van with a greater force and turn the corner and move across the rear of the vehicle at a greater velocity than it would when washing a substantially smaller vehicle. The frictional force will also vary with the degree to which the vehicle is dirty or clean. A clean, highly polished vehicle will present a substantially less frictional force than an extraordinarily dirty vehicle.

It should also be noted that the operation of the shuttle plates 90, 42, on the respective left and right washing machines 22, 24 are commonly controlled by the controller 202; but the motion of the arms 64, 96 are totally independent. As described above, the frictional forces on the brushes 68, 100 will vary with each vehicle. Further, the speed of the conveyor 208 may for different reasons vary over the speed commanded by the controller 202, and those variations will result in the shuttle plates 42, 90 appearing to move at slightly different times with respect to a reference point on the vehicle 26. Those variations will also result in the brushes 68, 100 not operating as perfect mirror images of each other. Their velocities around the rear corners and across the rear of a vehicle will differ with each vehicle and will differ when washing the same vehicle more than one time. In spite of any such variations, the left brush 100 will always wash more than 50% of the rear surface of the vehicle and will try to wash 100% of the rear surface. Similarly, the right brush 68 will always wash more than 50% of the rear surface of the vehicle.

The variation in the speeds of the brushes 100, 68 across the rear of the vehicle 26 may create a circumstance of interference. For example, referring to FIG. 5H, with the left shuttle 90 at its inward position, the arm 96 extends to the right of the inner ends of the right linear bearings 44, 46 (FIG. 1A). As the right shuttle plate 42 moves inward as illustrated in FIG. 5I, it is possible for the right shuttle plate 42 to hit the left arm 96. Such a situation creates an undesirable interference; and therefore, the left arm 96 has a bumper 110 mounted approximately at its center. The bumper 110 includes a contact pad 112 made of an ultrahigh molecular weight material, for example, a DELRIN material, commercially available from DuPont Company. Thus, with the bumper 110, as the shuttle plate 42 moves inward, if the left arm 66 is right of the inner ends of the bearings 44, 46, the shuttle plate 42 contacts the bumper 110 on the left arm 96 and pushes the left arm 96 and brush 100 to the left, preventing any potential undesirable interference between the brushes 68, 100. As will be appreciated, the bumper 110 can be replaced by other devices that permit the right shuttle plate 42 to push the arm 96, for example, a wheel.

The vehicle washing machine described with respect to FIGS. 1–5J provides a consistent high quality washing action to both sides and both ends of the vehicle, and the need for any supplemental manual washing is eliminated. Further, by maintaining the rotating cleaning elements in consistent contact with the vehicle, the cleaning elements walk over the surfaces of the vehicle more quickly, thereby providing a reduction in washing cycle time. Thus, more vehicles can be washed and the productivity is greater. The vehicle washing machine of the present invention is relatively simple in design, requires minimal floor space, has relatively few parts, is reliable and thus, generally more economical than known vehicle washing machines.

While the invention has been set forth by a description of the preferred embodiment in considerable detail, it is not intended to restrict or in any way limit the claims to such detail. Additional advantages and modifications will readily appear to those who are skilled in the art. For example, in the preferred embodiment, the shuttle plates 42, 90 are moved from their outer position to their inner positions when the controller 202 determines that the brushes 68, 100 are within six feet from the rear end of the vehicle. However, as will be appreciated, the shuttle plates 42, 90 may be moved from the outer to the inner positions at any time after the brushes 68, 100 have finished washing the front end of the car, that is, after the brushes 68, 100 have turned around the front corner of the vehicle but before the brushes 68, 100 turn around the rear corner of the vehicle. Further, the shuttle plates 42, 90 are returned to their starting outer positions immediately upon the brushes 68, 100 losing contact with the vehicle. However, the shuttle plates can be returned at any time after they have finished washing the rear end of the vehicle but before the brushes begin washing the front end of the next vehicle.

The left and right shuttle plate motors 56, 95 are disclosed as being cylinders 56, 95. As will be appreciated, those cylinders may be hydraulic or pneumatic; and further the cylinders 56, 95 may be mounted opposite from what is shown in FIG. 1. That is, one or both of the cylinders may be pivotally mounted to the shuttle plates and the respective cylinder rods may be pivotally attached to the frame. Further, the cylinders 56, 95 may be replaced by other drives, for example, a rack and pinion drive, a chain or belt drive, etc.

The cleaning elements 68, 100 are disclosed as being rotating, cylindrical brushes; however, as will be appreciated, the cleaning or washing elements 68, 100 may be noncylindrical or planar in shape and mounted for oscillation or other motion on the distal ends of the respective arms 64, 96. Preferably, the cleaning elements 68, 100 are mounted to have some continuous and repetitive motion to facilitate the cleaning process. However, as will be further appreciated, in an alternative embodiment, the cleaning elements 68, 100 may be static elements that simply wipe over the surfaces of the vehicle as it moves past the cleaning elements.

Therefore, the invention in its broadest aspects is not limited to the specific detail shown and described. Consequently, departures may be made from the details described herein without departing from the spirit and scope of the claims which follow.

What is claimed is:

1. A vehicle washing machine providing a first path of motion for a vehicle and washing a vehicle moving along the first path of motion, the vehicle washing machine comprising:
    a frame having a supporting member adapted to be located above the vehicle;
    a shuttle plate mounted on the supporting member of the frame and movable along a second path of motion;
    an arm having a proximal end pivotally mounted on the shuttle plate a distal end; and
    a cleaning element mounted at the distal end of the arm; and
    a sensor adapted to detect the presence of the the vehicle
    the shuttle plate moving the proximal end of the arm between outer and inner positions on the supporting member in response to different locations of the cleaning element with respect to the vehicle, thereby permitting the cleaning element to wash a greater portion of the vehicle.

2. A vehicle washing machine of claim 1 further comprising a shuttle plate motor for moving the shuttle plate along the second path of motion.

3. A vehicle washing machine of claim 2 wherein the second path of motion is generally perpendicular to the first path of motion.

4. A vehicle washing machine of claim 2 further comprising a linear bearing supporting the shuttle plate on the supporting member of the frame.

5. A vehicle washing machine of claim 2 wherein the shuttle plate motor is a cylinder connected between the frame and the shuttle plate.

6. A vehicle washing machine of claim 5 wherein the cylinder has one end connected to the frame and a distal end of a cylinder rod connected to the shuttle plate.

7. A vehicle washing machine of claim 6 wherein the proximal end of the arm is mounted on one side of the shuttle plate and the distal end of the cylinder rod is mounted to an opposite side of the shuttle plate.

8. A vehicle washing machine of claim 2 further comprising a biasing element mounted between the support plate and the arm to bias the arm inwardly with respect to the frame.

9. A vehicle washing machine of claim 8 further comprising
    a controller operatively connected to the shuttle plate motor, the controller adapted to receive input signals from a sensor detecting a presence of the vehicle moving along the first path.

10. A vehicle washing machine of claim 9 wherein the vehicle has opposed sides and front and rear ends and the shuttle plate is initially disposed at the outer position, thereby permitting the cleaning element to wash a side of the vehicle and at least half of the front end of the vehicle.

11. A vehicle washing machine of claim 10 wherein the frame has a centerline substantially parallel to the first path of motion, the controller determines a first position of the cleaning element with respect to the vehicle and operates the shuttle plate motor to move the shuttle plate along the second path of motion from an outer position to an inner position on the supporting member, such that at the inner position, a pivot axis of the proximal end of the arm is located substantially on the centerline of the frame, thereby permitting the cleaning element to wash at least half of the rear end of the vehicle.

12. A vehicle washing machine of claim 11 wherein the controller determines a second position of the cleaning element with respect to the vehicle and operates the shuttle plate motor to move the shuttle plate along the second path of motion from the inner position to the outer position on the supporting member.

13. A vehicle washing machine of claim 12 wherein when out of contact with the vehicle, the biasing element biases a centerline of the cleaning element to a location substantially on the centerline of the frame.

14. A vehicle washing machine of claim 12 wherein the first position of the cleaning element is a location of the cleaning element after the cleaning element has finished washing the front end of the vehicle.

15. A vehicle washing machine of claim 12 wherein the second position of the cleaning element is a location of the cleaning element after the cleaning element has finished washing the rear end of the vehicle.

16. A vehicle washing machine of claim 12 wherein the first position of the cleaning element is a location of the cleaning element approximately six feet from the rear end of the vehicle.

17. A vehicle washing machine of claim 12 wherein the second position of the cleaning element is a location of the cleaning element at which the cleaning element is out of contact with the rear end of the vehicle.

18. A vehicle washing machine of claim 12 wherein the cleaning element is a brush mounted to have a powered rotation with respect to a generally vertical axis.

19. A vehicle washing machine of claim 1 wherein the frame has a centerline and the inner position of the shuttle plate places the proximal end of the arm approximately on the centerline.

20. A vehicle washing machine providing a first path of motion for a vehicle and washing a vehicle moving along the first linear path, the vehicle washing machine comprising:
- a frame having a supporting member adapted to be located above the vehicle, the frame having a centerline substantially parallel to the first linear path;
- a shuttle plate mounted on the supporting member of the frame and movable along a second path of motion generally perpendicular to the first path of motion;
- a shuttle plate motor mechanically connected between the frame and the shuttle plate and moving the shuttle plate between outer position and inner positions on the second path of motion.
- an arm having a proximal end pivotally mounted on the support plate and a distal end;
- a cleaning element mounted to have a powered motion at the distal end of the arm;
- a sensor adapted to detect a presence of the vehicle with respect to the sensor; and
- a controller connected to the sensor and the shuttle plate motor and operating the shuttle plate motor to move the shuttle plate between the outer and inner positions in response to determining that the cleaning element is at different positions with respect to the vehicle, the inner position placing a pivot axis of the proximal end of the arm substantially on the centerline of the frame.

21. A vehicle washing machine of claim 20 wherein the powered motion of the cleaning element is a rotary motion with respect to an axis of rotation, and when out of contact with the vehicle, the biasing element biases the axis of rotation to a location substantially on the centerline of the frame.

22. A vehicle washing machine providing a first linear path for a vehicle and washing a vehicle moving along the first linear path, the vehicle having left and right sides and front and rear ends, the vehicle washing machine comprising:
- left and right supporting members adapted to be located above the vehicle;
- left and right shuttle plates mounted on the supporting members;
- left and right shuttle plate motors for moving the respective left and right shuttle plates along respective second linear paths;
- left and right arms having proximal ends pivotally mounted on the respective left and right shuttle plates and distal ends;
- left and right brushes mounted to have a powered rotation at the distal ends of the respective left and right arms, the brushes rotating in opposite directions with respect to a generally vertical axes;
- left and right biasing elements mounted between the respective left and right support plates and the respective left and right arms to bias the arms inwardly toward a center of the vehicle;
- a sensor adapted to detect a presence of the vehicle with respect to the sensor; and
- a controller connected to the sensor and the left and right shuttle plate motors, the left and right shuttle plates having outer positions permitting the respective left and right brushes to wash respective left and right sides of the vehicle, each of the shuttle plates moving a proximal end of a respective arm from the outer position to an inner position in response to the controller determining a first location of a respective brush with respect to the vehicle, thereby permitting the respective brush to wash a greater portion of the rear end of the vehicle.

23. A method of washing a vehicle moving along a first path of linear motion relative to a vehicle washing machine, the vehicle having left and right sides and front and rear ends, the method comprising:
- disposing a cleaning element with respect to one side of the vehicle, the cleaning element being mounted to a distal end of an arm, the proximal end of the arm being pivotally attached to a shuttle plate located at an outer position with respect to a supporting member;
- moving the vehicle in a first direction to cause the cleaning element to wipe across surfaces on a side of the vehicle;
- detecting the cleaning element being at a first location with respect to the vehicle;
- initiating motion of the shuttle plate through a displacement from the outer position to an inner position,
- continuing to move the vehicle in the first direction to cause the cleaning element to wipe across surfaces on at least half of a rear end of the vehicle;
- detecting the cleaning element being at a second location with respect to the vehicle; and
- initiating motion of the shuttle plate through the displacement from the inner position to the outer position.

24. A method of claim 23 wherein after initiating motion of the shuttle plate through a displacement from the outer position to an inner position further comprises moving the proximal end of the arm to a position generally at a center line of the vehicle washing machine.

25. A method of washing a vehicle moving along a first path of linear motion relative to a vehicle washing machine, the vehicle having left and right sides and front and rear ends, the method comprising:
- disposing a cleaning element with respect to one side of the vehicle, the cleaning element being mounted to a distal end of an arm, the proximal end of the arm pivoting with respect to a pivot axis, and the proximal end of the arm being located at an outer position toward one side of the vehicle to facilitate the cleaning element washing the front end of the vehicle;
- moving the vehicle in a first direction to cause the cleaning element to wipe across surfaces on at least half of the front end and surfaces on the one side of the vehicle;
- detecting the cleaning element being at a first location with respect to the vehicle;
- moving the proximal end of the arm from the outer position to an inner position away from the one side of the vehicle to facilitate the cleaning element washing the rear end of the vehicle;
- continuing to move the vehicle in the first direction to cause the cleaning element to wipe across surfaces on at least half of the rear end of the vehicle;
- detecting the cleaning element being at a second location with respect to the vehicle; and
- initiating motion of the proximal end of the arm from the inner position to the outer position.

26. A method of washing a vehicle moving along a first path of linear motion relative to a vehicle washing machine, the vehicle having left and right sides and front and rear ends, the method comprising:

disposing left and right rotating brushes with respect to respective left and right sides of the vehicle, the left and right rotating brushes being mounted to distal ends of respective left and right arms, the proximal ends of the left and right arms pivoting about respective left and right pivot axes;

moving the vehicle in a first direction to cause the left and right rotating brushes to wash surfaces on the front end of the vehicle and surfaces on respective left and right sides of the vehicle;

determining a first position of the left rotating brush with respect to the vehicle;

moving the left pivot axis from the outer position to an inner position;

continuing motion of the vehicle in the first direction to cause the left rotating brush to wash surfaces on at least a first half of the rear end of the vehicle;

determining a second position of the right rotating brush with respect to the vehicle;

moving the right pivot axis from the outer position to an inner position;

continuing motion of the vehicle in the first direction to cause the right rotating brush to wash at least a second half of the rear end of the vehicle;

determining a third position of the left rotating brush with respect to the vehicle;

moving the left pivot axis from the inner position to the outer position;

determining a fourth position of the right cleaning element with respect to the vehicle; and moving the right pivot axis from the inner position to the outer position.

27. A method of claim 26 wherein the first position of the left rotating brush is any position of the left rotating brush along the left side of the vehicle.

28. A method of claim 26 wherein the second position of the right rotating brush is any position of the right rotating brush along the right side of the vehicle.

29. A method of claim 26 wherein the third position of the left rotating brush is any position of the left rotating brush after it finishes washing the rear end of the vehicle.

30. A method of claim 26 wherein the fourth position of the right rotating brush is any position of the right rotating brush after it finishes washing the rear end of the vehicle.

31. A vehicle washing machine providing a first path of motion for a vehicle and washing a vehicle moving along the first path of motion, the vehicle washing machine comprising:

a frame having a centerline and a supporting member adapted to be located above the vehicle;

a shuttle plate mounted on the supporting member of the frame and movable along a second path of motion;

an arm having a proximal end pivotally mounted on the shuttle plate and a distal end; and a cleaning element mounted at the distal end of the arm, the shuttle plate moving the proximal end of the arm on the supporting member between the centerline of the frame and an outer position displaced from the centerline in response to different locations of the cleaning element with respect to the vehicle, thereby permitting the cleaning element to wash a greater portion of the vehicle.

32. A method of washing a vehicle moving along a first path of linear motion relative to a vehicle washing machine, the vehicle having left and right sides and front and rear ends, the method comprising:

disposing a cleaning element with respect to one side of the vehicle, the cleaning element being mounted to a distal end of an arm, the proximal end of the arm being pivotally attached to a frame at a first position displaced from a centerline of the frame;

moving the vehicle in a first direction to cause the cleaning element to wipe across surfaces on the one side of the vehicle;

detecting the cleaning element being at a first location with respect to the vehicle;

moving the proximal end of the arm to a second position substantially on the centerline of the frame;

continuing to move the vehicle in the first direction to cause the cleaning element to wipe across surfaces on at least half of a rear end of the vehicle;

detecting the cleaning element being at a second location with respect to the vehicle; and initiating motion of the proximal end of the arm from the second position back to the first position.

33. A vehicle washing machine providing a first linear path for a vehicle and washing the vehicle moving along the first linear path, the vehicle having left and right sides and front and rear ends, the vehicle washing machine comprising:

left and right frames having respective left and right supporting members adapted to be located above the vehicle, the left and right frames having a common centerline substantially parallel to the first linear path;

left and right shuttle plates mounted on respective left and right supporting members for motion along a second linear path substantially perpendicular to the first linear path;

left and right shuttle plate motors mounted between the respective left and right supporting members and respective left and right shuttle plates, the left and right shuttle plate motors moving the respective left and right arms between respective outer positions along the second linear path and respective inner positions along the second linear path;

left and right brushes mounted at the distal ends of respective left and right shuttle plates and distal ends, the proximal ends of the left and right arm pivoting about respective left and right pivot axes, the left and right pivot axes being located substantially on the common centerline upon the respective left and right shuttle plates being moved to the respective inner positions;

left and right brushes mounted at the distal ends of respective left and right arms, the brushes having powered rotations in opposite directions with respect to respective left and right axes of rotation; and left and right biasing elements mounted between the respective left and right support plates and the respective left and right arms to independently bias the respective left and right arms inwardly toward the common centerline.

34. A vehicle washing machine of claim 33 further comprising:

a sensor adapted to detect a presence of the vehicle; and a controller connected to the sensor and the left and right shuttle plate motors, the left and right shuttle plates having outer positions permitting the respective left and right brushes to wash respective left and right sides of the vehicle, each of the shuttle plates moving a proximal end of a respective arm from the outer position to an inner position in response to the controller determining a first location of a respective brush with respect to the vehicle, thereby permitting the respective brush to wash at least half of the rear end of the vehicle.

35. A vehicle washing machine of claim 33 wherein when out of contact with the vehicle the left and right biasing elements biasing the respective left and arms to locations placing respective left and right axes of rotation substantially on the centerline of the frame.

36. A vehicle washing machine of claim 33 wherein one of the left and right arms is mounted to one of the respective left and right shuttle plates at a lower position, such that the one of the left and right arms is movable below the other of the left and right arms.

37. A method of washing a vehicle moving along a first path of linear motion relative to a vehicle washing machine, the vehicle having first and second sides and front and rear ends, the method comprising:

disposing first and second rotating brushes at the front end of the vehicle, the first and second rotating brushes being mounted to distal ends of respective first and second arms, the proximal ends of the first and second arms pivoting about respective first and second pivot axes disposed at respective first and second outer positions;

moving the vehicle in a first direction to cause the first and second rotating brushes to wash surfaces on the front end of the vehicle and surfaces on respective first and second sides of the vehicle;

moving the first pivot axis from the first outer position to a first inner position substantially on a centerline of the vehicle to cause the first rotating brush to wash surfaces on at least a first half of the rear end of the vehicle;

moving the first pivot axis from the first inner position to the first outer position;

moving the second pivot axis from the second outer position to a second inner position substantially on the centerline of the vehicle to cause the second rotating brush to wash at least a second half of the rear end of the vehicle; and moving the second pivot axis from the second inner position to the second outer position.

38. A vehicle washing machine of claim 37 further comprising disposing the first and second rotating brushes at the front end of the vehicle substantially on the centerline of the vehicle.

39. A vehicle washing machine of claim 38 further comprising disposing the first rotating brush substantially on the centerline of the vehicle in response to moving the first pivot axis from the first inner position to the first outer position and disposing the second rotating brush substantially on the centerline of the vehicle in response to moving the second pivot axis from the second inner position to the second outer position.

* * * * *

UNITED STATES PATENT AND TRADEMARK OFFICE
CERTIFICATE OF CORRECTION

PATENT NO.    : 6,264,754 B1
DATED         : July 24, 2001
INVENTOR(S)   : Bradford K. Bowman It is certified that error appears in the above-identified patent and that said Letters Patent is hereby corrected as shown below:

Column 4,
Line 35, reads "vehical 26" and should read -- vehicle 26 --.

Column 5,
Line 1, reads "connected their opposite" and should read -- connected at their opposite --.

Column 7,
Lines 14 and 26, read "FIG. 51" and should read -- FIG. 5I --.
Line 36, reads "moves across and wash" and should read -- moves across and washes --.

Column 8,
Line 36, reads "FIG. 51" and should read -- FIG. 5I --.

Column 9,
Line 55, reads "a distal end; and" and should read -- and a distal end; --.
Line 59, reads "of the the vehicle" and should read -- of the vehicle --.

Column 11,
Line 20, reads "motion.an arm" and should read -- motion; an arm --.
Line 59, reads "to a generally vertical" and should read -- to generally vertical --.

Column 14,
Line 46, reads "left and right brushes mounted at the distal ends of respective left and right shuttle plates and distal ends, the" and should read -- left and right arms having proximal ends mounted on the respective left and right shuttle plates and distal ends, the --.

UNITED STATES PATENT AND TRADEMARK OFFICE
CERTIFICATE OF CORRECTION

PATENT NO. : 6,264,754 B1
DATED : July 24, 2001
INVENTOR(S) : Bradford K. Bowman It is certified that error appears in the above-identified patent and that said Letters Patent is hereby corrected as shown below:

Column 15,
Line 10, reads "with the vehicle the" and should read -- with the vehicle, the --.
Line 11, reads "left and arms" and should read -- left and right arms --.

Signed and Sealed this

Fifth Day of November, 2002

Attest:

Attesting Officer

JAMES E. ROGAN
Director of the United States Patent and Trademark Office